US009043939B2

(12) United States Patent
Belvin et al.

(10) Patent No.: US 9,043,939 B2
(45) Date of Patent: May 26, 2015

(54) ACCESSING INFORMATION DURING A TELECONFERENCING EVENT

(71) Applicant: International Business Machines Corporation, Armonk, NY (US)

(72) Inventors: Marcus L. Belvin, Raleigh, NC (US); Matthew C. Hillary, Kihei, HI (US); Kimberly D. McCall, Leander, TX (US); Henri F. Meli, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/661,087

(22) Filed: Oct. 26, 2012

(65) Prior Publication Data

US 2014/0123313 A1    May 1, 2014

(51) Int. Cl.
*G06F 7/04* (2006.01)
*G06F 17/30* (2006.01)
*H04N 7/16* (2011.01)
*G10L 15/26* (2006.01)

(52) U.S. Cl.
CPC ........ *G06F 17/30017* (2013.01); *G10L 15/265* (2013.01)

(58) Field of Classification Search
CPC .................. G06F 17/30017; G06F 17/30746; G06F 17/30654; G10L 15/265; G10L 15/26; H04L 29/00; H04M 3/569; H04M 3/42042; H04M 2201/41; H04M 2201/38; H04M 3/567
USPC ........................................ 726/1–5, 21, 27–30
See application file for complete search history.

(56) References Cited

U.S. PATENT DOCUMENTS

| | | | |
|---|---|---|---|
| 5,444,673 A * | 8/1995 | Mathurin | 368/63 |
| 5,857,189 A * | 1/1999 | Riddle | 1/1 |
| 8,037,070 B2 | 10/2011 | Maghoul | |
| 8,312,507 B2 * | 11/2012 | Chen et al. | 726/1 |
| 2002/0010927 A1 * | 1/2002 | Kim | 725/40 |
| 2004/0117218 A1 * | 6/2004 | Friedrich et al. | 705/5 |
| 2004/0250201 A1 * | 12/2004 | Caspi | 715/512 |
| 2005/0018828 A1 | 1/2005 | Nierhaus et al. | |
| 2006/0155903 A1 * | 7/2006 | Soga et al. | 710/240 |
| 2006/0227946 A1 * | 10/2006 | Henderson | 379/100.01 |
| 2007/0165792 A1 * | 7/2007 | Song et al. | 379/80 |
| 2007/0213980 A1 * | 9/2007 | Danner et al. | 704/231 |
| 2008/0240379 A1 | 10/2008 | Maislos et al. | |

(Continued)

OTHER PUBLICATIONS

IBM, "System for Automatic Mining and Display of Pertinent Information during Conversation", Jul. 19, 2007, IP.com [online], [retrieved on Jul. 11, 2012]. Retrieved from: Prior Art Database, IP.com No. IPCOM000155776D.

(Continued)

*Primary Examiner* — Eleni Shiferaw
*Assistant Examiner* — Jing Sims
(74) *Attorney, Agent, or Firm* — Maeve L. McCarthy

(57) ABSTRACT

A method for accessing information during a teleconferencing event. The method includes identifying a reference to a document transmitted by a telecommunication device participating in a teleconferencing event and identifying a name of the referenced document. The method includes determining, by a computer, an identity of a user of the participating telecommunication device. The method further includes determining the user has permission to access the identified document and, in response, transmitting the identified document to the participating telecommunication device.

20 Claims, 3 Drawing Sheets

(56) References Cited

U.S. PATENT DOCUMENTS

| | | | |
|---|---|---|---|
| 2008/0275701 A1 | 11/2008 | Wu et al. | |
| 2009/0044132 A1* | 2/2009 | Combel et al. | 715/753 |
| 2011/0099019 A1* | 4/2011 | Zopf | 704/500 |
| 2011/0137823 A1* | 6/2011 | Robb | 705/36 R |
| 2011/0202631 A1* | 8/2011 | Berna Fornies et al. | 709/219 |
| 2013/0006626 A1* | 1/2013 | Aiyer et al. | 704/235 |
| 2013/0152168 A1* | 6/2013 | Nasir et al. | 726/4 |
| 2014/0123313 A1* | 5/2014 | Belvin et al. | 726/28 |

OTHER PUBLICATIONS

Renals et al., "Edinburgh Research Archive: Recognition and interpretation of meetings: The AMI and AMIDA projects" 2007 [online], [retrieved on Aug. 28, 2012]. Retrieved from the Internet <URL: http://www.era.lib.ed.ac.uk/handle/1842/2135>.

* cited by examiner

ACCESSING INFORMATION DURING A TELECONFERENCING EVENT

FIELD OF THE INVENTION

The present invention relates generally to the field of multimedia conferencing, and more particularly to accessing information during a teleconferencing event.

BACKGROUND OF THE INVENTION

In multimedia conferencing, typically, a central server or other device manages the conference and maintains the various communications paths to computers or other client devices being used by parties to participate in the conference. Parties to the conference can communicate via voice and/or video through the server and their client devices, which can include, for example, a personal digital assistant, smart phone, telephone, or desktop workstation.

When people communicate during a teleconferencing event, for example, a conference call, web or video conference, it is often desirable for all parties to have access to various documents and other information relevant to the conversation. For example, when a customer speaks with a vendor about an ongoing project, it can be useful to have project information available. Some of this information can be obtained before a conversation occurs. For example, before calling the vendor, the customer can retrieve notes from a previous conversation or can download the latest specifications for the project from a company server.

SUMMARY

Embodiments of the present invention disclose a method, computer program product, and computer system for accessing information during a teleconferencing event. The method includes identifying a reference to a document transmitted by a telecommunication device participating in a teleconferencing event, and identifying a name of the referenced document. The method includes determining, by a computer, an identity of a user of the participating telecommunication device. The method further includes determining, by a computer, the user has permission to access the identified document. In response to determining the user has permission to access the identified document, the method includes transmitting the identified document to the participating telecommunication device.

DETAILED DESCRIPTION

Figure 1:
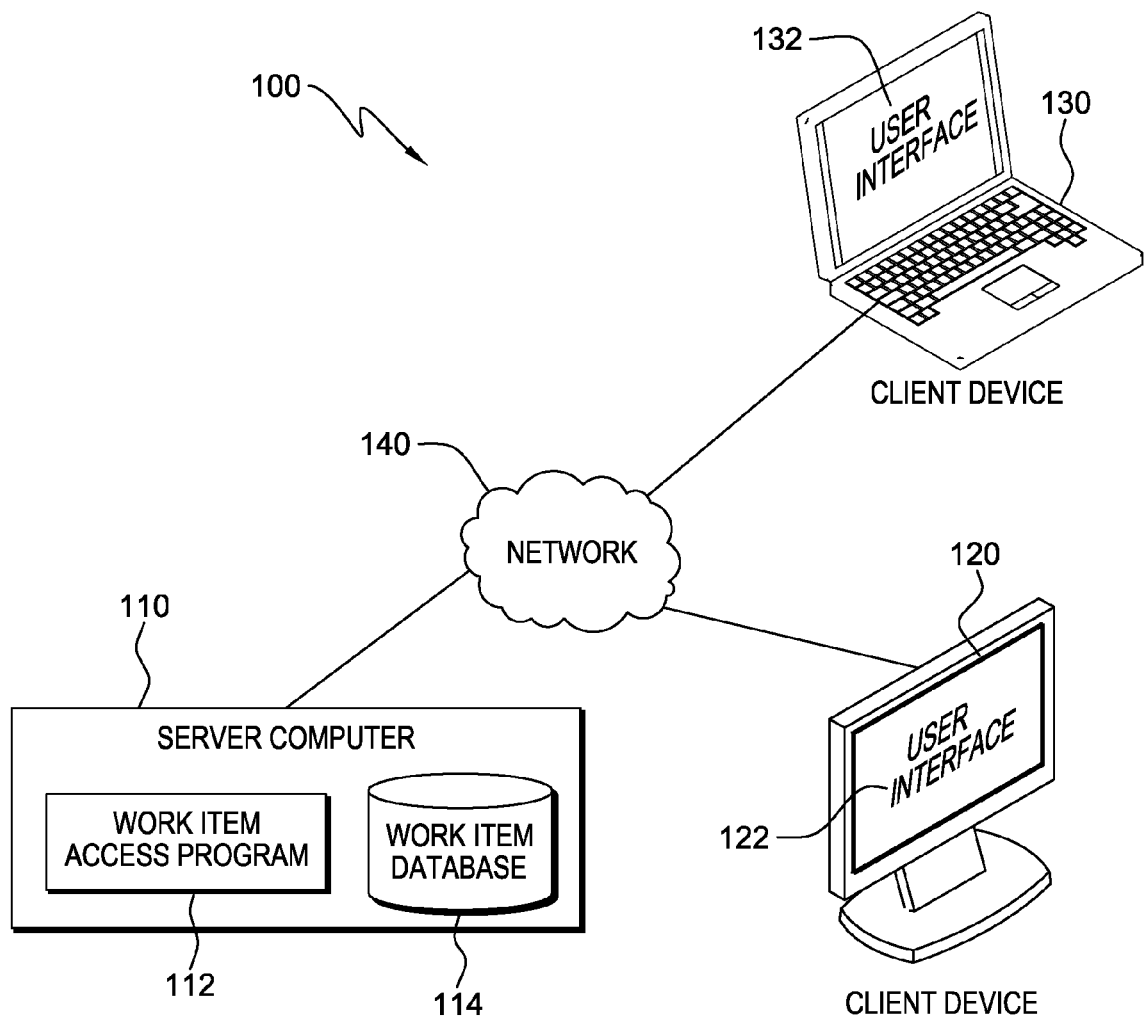
FIG. 1 is a functional block diagram illustrating a multimedia conferencing environment, in accordance with an embodiment of the present invention.

As will be appreciated by one skilled in the art, aspects of the present invention can be embodied as a method, computer system, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer-readable storage medium(s) having computer readable program code/instructions embodied thereon.

Any combination of computer-readable storage media can be utilized. A computer-readable storage medium can be, for example, but not limited to, an electronic, magnetic, optical, or semiconductor system, apparatus, or device, or any suitable combination of the foregoing. More specific examples (a non-exhaustive list) of a computer-readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java®, Smalltalk, C++ or the like and conventional procedural programming languages, such as the "C" programming language or similar programming languages. The program code can execute entirely on a user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a multimedia conferencing environment, generally designated 100, in accordance with one embodiment of the present invention.

Multimedia conferencing environment 100 includes server computer 110 and client devices 120 and 130, all interconnected over network 140.

Server computer 110 can be a laptop computer, tablet computer, netbook computer, personal computer (PC), a desktop computer, a personal digital assistant (PDA), a smart phone, or any programmable electronic device capable of communicating with client devices 120 and 130 via network 140. Server computer 110 can include internal and external hardware components, as depicted and described in further detail with respect to FIG. 3. Server computer 110 includes work item access program 112 and work item database 114.

Work item access program 112 analyzes speech and other audio data transmitted during a teleconferencing event in multimedia conferencing environment 100 in order to identify work items referenced in the teleconferencing event. The term "work item", as used herein, can include documents, word processing files, HTML files, drawings, or other work related items that can be discussed during a teleconferencing event and can be received by a client device, such as client device 120 or client device 130, via network 140. As work items are identified, work item access program 112 notifies participants of the identified work item and determines whether any participant chooses to access the identified work item. A participant in a teleconferencing event can be a user of a client device, for example client device 120 or client device 130, which includes a telecommunication device. Work items are opened for viewing and/or updating on a participant's client device, based on permissions granted to the participant to view or update. If participants do not have permission to view or to update the located work item, permission for temporary access can be granted during the teleconferencing event by another participant.

Work item database 114 stores work items, which include, for example, word processing documents, invention disclosures, meeting agendas, presentations, news articles, or any other item that can be referenced during a teleconferencing event, accessed by work item access program 112 within multimedia conferencing environment 100 and viewed on one or more of client device 120 and 130. In one embodiment, work item database 114 can be located on server computer 110. In an alternative embodiment, work item database 114 can be located on a storage device accessible to server computer 110 via network 140.

Although client devices 120 and 130 are shown in FIG. 1 as a desktop computer and a laptop computer, respectively, one of skill in the art will appreciate that in various other embodiments of the present invention, client devices 120 and 130 can each be a laptop computer, tablet computer, netbook computer, personal computer (PC), a desktop computer, a personal digital assistant (PDA), a smart phone, or any programmable electronic device capable of communicating with server computer 110 via network 140 within multimedia conferencing environment 100. Client devices 120 and 130 include, respectively, user interface (UI) 122 and user interface (UI) 132. UI 122 and UI 132 each provide an interface that can display text, user options and work items in various applications to a user of client device 120 and 130, respectively. UI 122 and UI 132 can each be, for example, a web user interface (WUI) or a graphical user interface (GUI). Client devices 120 and 130 also include telecommunication capabilities through, for example, a microphone, a telephone, or any other device capable of receiving and converting speech or other sounds into an electrical signal to be transmitted through multimedia conferencing environment 100 via network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server computer 110 and client devices 120 and 130.

Figure 2:
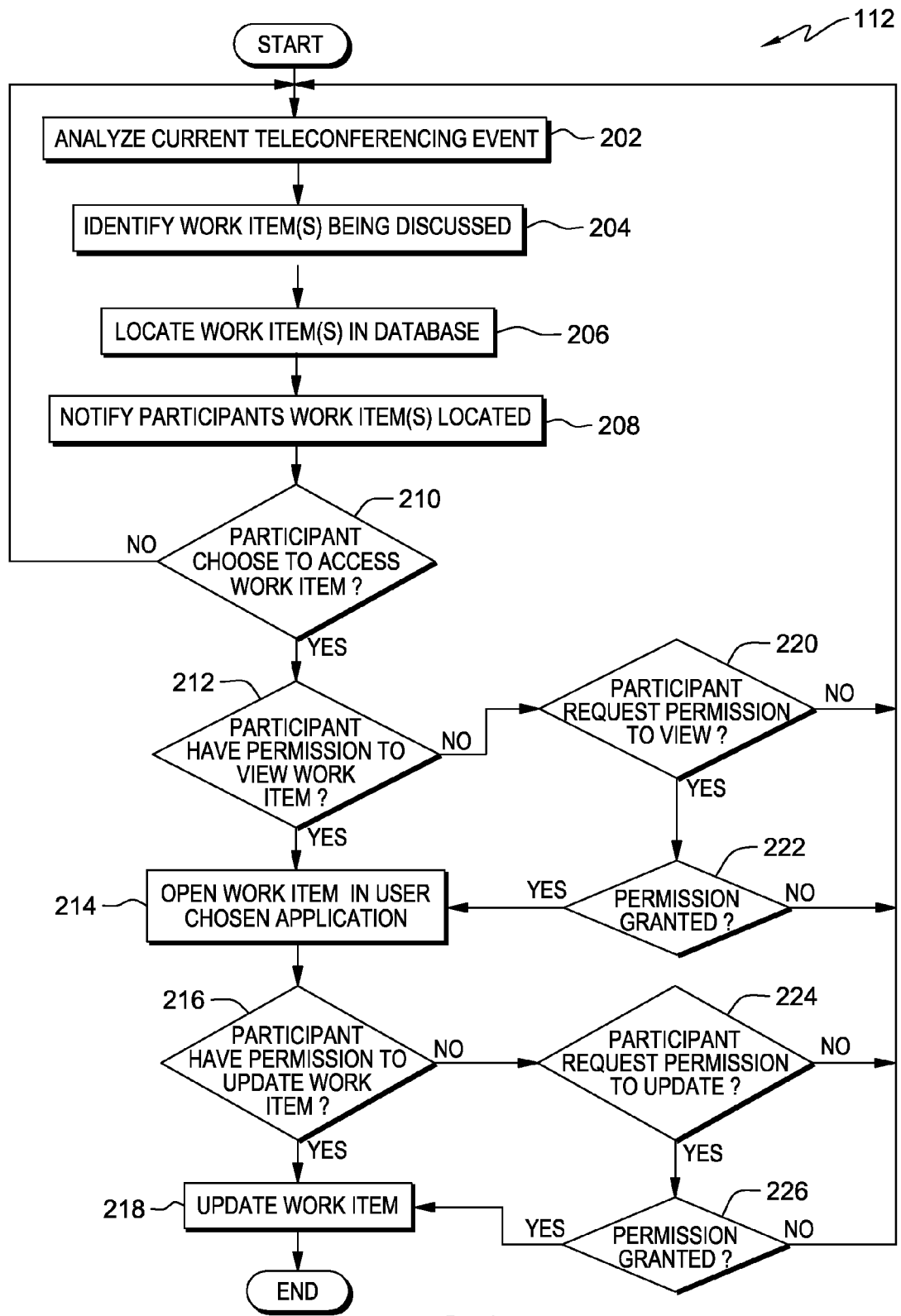
FIG. 2 is a flowchart depicting operational steps of a work item access program, for identifying and accessing work items referenced during a teleconferencing event, in accordance with an embodiment of the present invention.

FIG. 2 is a flowchart depicting operational steps of work item access program 112 of FIG. 1, for identifying and accessing work items referenced during a teleconferencing event, in accordance with an embodiment of the present invention.

Work item access program 112 analyzes a current teleconferencing event, for example, a conference call, in multimedia conferencing environment 100 (step 202) and identifies a work item, or work items, being discussed by participants in the teleconferencing event, for example, users of telecommunication devices participating in the teleconferencing event (step 204). Work item access program 112 can identify work items, for example, word processing documents or invention disclosures, by recognition of a file name or disclosure number. Participants are connected to the teleconferencing event through voice media, for example, a telephone or other telecommunication device included with their respective client devices, as well as another multimedia application used for viewing work items, for example, a web browser, on their respective client devices.

Work item access program 112 locates the identified work item(s) in work item database 114 (step 206) and notifies participants in the teleconferencing event the item has been located (step 208). Work item access program 112 determines whether participants choose to access the located work item on their respective client devices (decision block 210). If participants do not choose to access the located work item (decision block 210, no branch), work item access program 112 continues to analyze the current teleconferencing event (step 202). A participant can choose not to access the located work item, for example, if the located work item is already open on the participant's client device or the participant has a hard copy of the work item.

If a participant chooses to access the located work item (decision block 210, yes branch), work item access program 112 determines whether the identified participant has permission to view the work item (decision block 212). In order for work item access program 112 to determine whether a participant has permission to view work items, the identity of each participant in a teleconferencing event must be determined separately, for example, by the use of voice recognition systems. Voice recognition typically involves an enrollment process, where the voice recognition system learns the speaker it is supposed to recognize prior to having to identify the speaker. Enrollment can include recording a known participant's voice and extracting a number of features to form a voice print, or template. To identify a participant during a teleconferencing event, a speech sample from the participant is compared against a previously created voice print, or template.

If the identified participant has permission to view the located work item (decision block 212, yes branch), the work item is opened in a user chosen application on the participant's respective client device (step 214). Participants can set preferences as to which application a work item can be opened in, for example, a referenced document can be opened in a web browser or a word processing application. If an identified participant does not have permission to view the located work item (decision block 212, no branch), the participant can request permission to view (step 220). Permission for temporary access can be granted by other identified participants taking part in the teleconferencing event that have the ability to grant permission based on, for example, position, clearance, or other rank. If the participant requests permission to view a located work item (decision block 220, yes branch), and permission is granted (decision block 222, yes branch), the located work item is opened in a user chosen application on the participant's client device (step 214).

If an identified participant chooses not to request permission to view the located work item (decision block 220, no branch), work item access program 112 continues to analyze the current teleconferencing event (step 202). If an identified participant requests permission to view a located work item (decision block 220, yes branch), and permission is not granted (decision block 222, no branch), work item access program 112 continues analysis of the current teleconferencing event (step 202). Permission can not be granted, for example, if the teleconferencing event participants are discussing confidential documents.

Work item access program 112 determines whether an identified participant, who has permission to view the located work item, can also have permission to update the located work item (decision block 216). If an identified participant has permission to update the work item (decision block 216, yes branch), work item access program 112 updates the work item in the user chosen application, for example, a word processing application, on the participant's client device (step 218). Updates to work items can be performed using speech recognition software, such as, for example, Dragon NaturallySpeaking® by Nuance Communication, Inc. or Embedded ViaVoice® by IBM. If an identified participant does not have permission to update a located work item (decision block 216, no branch), the participant can request permission for temporary access to update the work item (decision block 224). If the participant does not request permission to update (decision block 224, no branch), or if the participant requests permission (decision block 224, yes branch) and permission is not granted (decision block 226, no branch), work item access program 112 continues analyzing the current conferencing event (step 202). If an identified participant does request permission to update (decision block 224, yes branch), and permission is granted by another identified participant (decision block 226, yes branch), work item access program 112 updates the located work item (step 218). In various embodiments of the present invention, work items, after being updated, are saved in work item database 114.

Figure 3:
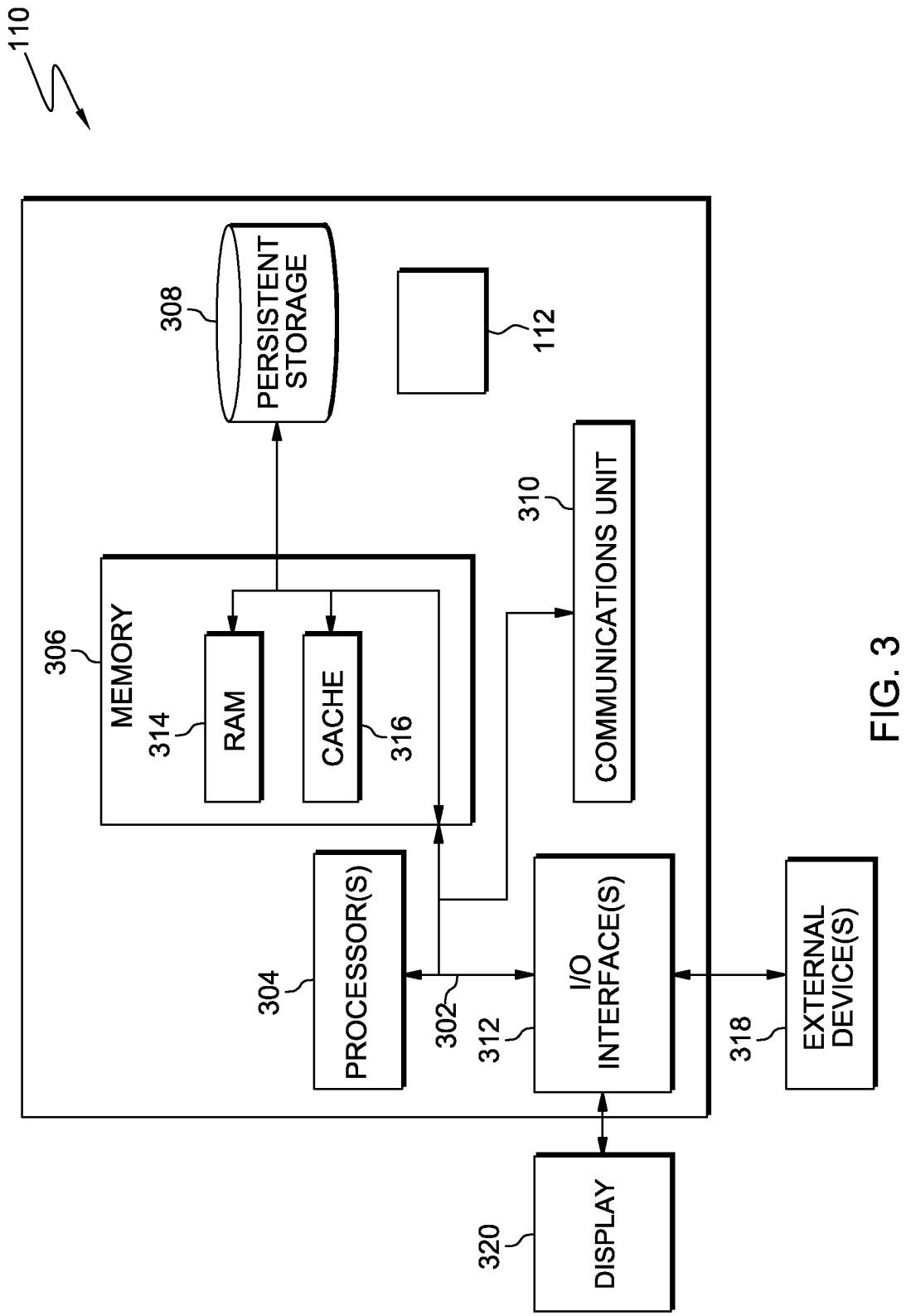
FIG. 3 depicts a block diagram of components of the server computer of FIG. 1, in accordance with an embodiment of the present invention.

FIG. 3 depicts a block diagram of components of server computer 110 in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Work item access program 112 and work item database 114 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including client devices 120 and 130. In these examples, communications unit 310 includes one or more network interface cards. Communications unit 310 can provide communications through the use of either or both physical and wireless communications links. Work item access program 112 and work item database 114 can be downloaded to persistent storage 308 through communications unit 310.

I/O interface(s) 312 allows for input and output of data with other devices that can be connected to server computer 110. For example, I/O interface 312 can provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., work item access program 112 and work item database 114, can be stored on such portable computer-readable storage media and can be loaded onto persistent storage 308 via I/O interface(s) 312. I/O interface(s) 312 also connect to a display 320. Display 320 provides a mechanism to display data to a user and can be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for accessing information during a teleconferencing event, the computer program product comprising:
   one or more computer-readable tangible storage media and program instructions stored on the one or more computer-readable tangible storage media, wherein the one or more computer-readable tangible storage media is hardware, the program instructions comprising:
   program instructions to identify a reference to a document transmitted by a telecommunication device participating in a teleconferencing event, wherein the program instructions to identify include using speech analysis to identify the reference to the document being discussed during the teleconferencing event;
   program instructions to determine an identity of a user of the participating telecommunication device;
   program instructions to determine the user has permission to access the identified document;
   responsive to determining the user has permission to access the identified document, program instructions to transmit the identified document to the participating telecommunication device;
   program instructions to determine the user has permission to update the identified document;
   responsive to determining the user has permission to update the identified document, program instructions to receive an update to the identified document from the user using speech recognition software; and
   program instructions to update the identified document on a participating telecommunication device of the user during the teleconferencing event.

2. The computer program product of claim 1, further comprising program instructions to display the identified document.

3. The computer program product of claim 1, wherein the program instructions to determine, by a computer, whether the user has permission to access the identified document further comprise, responsive to determining the user does not have permission to access the identified document, program instructions not to transmit the identified document to the participating telecommunication device.

4. The computer program product of claim 1, wherein the program instructions to identify a reference to a document in a teleconferencing event comprises, based on audio data transmitted by a telecommunication device, program instructions to identify words, phrases, numbers or sounds.

5. The computer program product of claim 1, wherein the program instructions to determine the user has permission to access the identified document is in response to a computer receiving a request from the participating telecommunication device requesting access to the identified document.

6. The computer program product of claim 1, further comprising:
   program instructions to send the updated document to a database.

7. The computer program product of claim 1, wherein the identified document includes at least one of a word processing file, a presentation, a meeting agenda, or a contact list.

8. The computer program product of claim 1, wherein the program instructions to determine an identity of a user of the participating telecommunication device further comprise:
   program instructions to determine a speech sample from the user; and
   program instructions to compare the speech sample to a previously created voice print.

9. The computer program product of claim 1, wherein the program instructions to determine the user has permission to access the identified document further comprise program instructions to determine a security clearance, a managerial level, or a password authentication of the user.

10. The computer program product of claim 1, further comprising, responsive to determining the user does not have permission to access the identified document;
    program instructions to receive a request for permission to view the identified document;
    program instructions to determine whether permission for temporary access is granted to the user; and
    responsive to determining the user is granted temporary access to view the identified document, program instructions to transmit the identified document to the participating telecommunication device of the user.

11. A computer system for accessing information during a teleconferencing event, the computer system comprising:
    one or more computer processors;
    one or more computer-readable tangible storage media;
    program instructions stored on the one or more computer-readable tangible storage media for execution by at least one of the one or more computer processors, wherein the one or more computer-readable tangible storage media is hardware, the program instructions comprising:
    program instructions to identify a reference to a document transmitted by a telecommunication device participating in a teleconferencing event, wherein the program instructions to identify include using speech analysis to identify the reference to the document being discussed during the teleconferencing event;
    program instructions to determine an identity of a user of the participating telecommunication device;
    program instructions to determine the user has permission to access the identified document;
    responsive to determining the user has permission to access the identified document, program instructions to transmit the identified document to the participating telecommunication device;
    program instructions to determine the user has permission to update the identified document;
    responsive to determining the user has permission to update the identified document, program instructions to receive an update to the identified document from the user using speech recognition software; and program instructions to update the identified document on a participating telecommunication device of the user during the teleconferencing event.

12. The computer system of claim 11, further comprising program instructions to display the identified document.

13. The computer system of claim 11, wherein the program instructions to determine, by a computer, whether the user has permission to access the identified document further comprise, responsive to determining the user does not have permission to access the identified document, program instructions not to transmit the identified document to the participating telecommunication device.

14. The computer system of claim 11, wherein the program instructions to identify a reference to a document in a teleconferencing event comprises, based on audio data transmitted by a telecommunication device, program instructions to identify words, phrases, numbers or sounds.

15. The computer system of claim 11, wherein the program instructions to determine the user has permission to access the identified document is in response to a computer receiving a request from the participating telecommunication device requesting access to the identified document.

16. The computer system of claim 11, further comprising:
program instructions to send the updated document to a database.

17. The computer system of claim 11, wherein the identified document includes at least one of a word processing file, a presentation, a meeting agenda, or a contact list.

18. The computer system of claim 11, wherein the program instructions to determine an identity of a user of the participating telecommunication device further comprise:
program instructions to determine a speech sample from the user; and
program instructions to compare the speech sample to a previously created voice print.

19. The computer system of claim 11, wherein the program instructions to determine the user has permission to access the identified document further comprise program instructions to determine a security clearance, a managerial level, or a password authentication of the user.

20. The computer program product of claim 1, further comprising, wherein responsive to determining the identity of the user of the participating telecommunication device;
program instructions to determine whether the user chooses to access the identified document; and
responsive to determining the user does not choose to access the identified document, program instructions to not determine the user has permission to access the identified document.

\* \* \* \* \*